(12) United States Patent
Loucks et al.

(10) Patent No.: US 9,399,963 B2
(45) Date of Patent: Jul. 26, 2016

(54) MISFIRE DETECTION SYSTEM

(71) Applicant: Tula Technology Inc., San Jose, CA (US)

(72) Inventors: Charles H. Loucks, Santa Clara, CA (US); Joel D. Van Ess, Campbell, CA (US); Siamak Hashemi, Farmington Hills, CA (US); Louis J. Serrano, Los Gatos, CA (US); Mohammad R. Pirjaberi, San Jose, CA (US); Shikui Kevin Chen, San Jose, CA (US); Matthew A. Younkins, San Jose, CA (US); Mark A. Shost, Northville, MI (US); Mark A. Wilcutts, Berkeley, CA (US)

(73) Assignee: Tula Technology, Inc., San Jose, CA (US)

( * ) Notice: Subject to any disclaimer, the term of this patent is extended or adjusted under 35 U.S.C. 154(b) by 325 days.

(21) Appl. No.: 14/207,109

(22) Filed: Mar. 12, 2014

(65) Prior Publication Data

US 2014/0261317 A1 Sep. 18, 2014

Related U.S. Application Data

(60) Provisional application No. 61/799,180, filed on Mar. 15, 2013, provisional application No. 61/897,686, filed on Oct. 30, 2013.

(51) Int. Cl.
*F02D 41/14* (2006.01)
*F02D 41/00* (2006.01)
(Continued)

(52) U.S. Cl.
CPC ........ *F02D 41/0087* (2013.01); *F02D 19/0623* (2013.01); *F02D 41/22* (2013.01);
(Continued)

(58) Field of Classification Search
CPC ............ F02D 19/0623; F02D 41/0087; F02D 2200/1015; G01M 15/046; G01M 15/11; G01M 15/12

USPC .......... 123/350, 479, 406.16, 406.18, 406.21; 701/102, 107, 109, 110, 111, 114; 73/114.02, 114.04–114.12, 35.01
See application file for complete search history.

(56) References Cited

U.S. PATENT DOCUMENTS

| 4,434,767 A | 3/1984 | Kohama et al. |
| 4,489,695 A | 12/1984 | Kohama et al. |

(Continued)

FOREIGN PATENT DOCUMENTS

JP 2013-343411 12/2003

OTHER PUBLICATIONS

International Search Report dated Jul. 8, 2014 from International Application No. PCT/US2014/026142.

(Continued)

*Primary Examiner* — Mahmoud Gimie
(74) *Attorney, Agent, or Firm* — Beyer Law Group LLP

(57) ABSTRACT

A variety of methods and arrangements for detecting misfire in a skip fire engine control system are described. In one aspect, a window is assigned to a target firing opportunity for a target working chamber. A change in an engine parameter is measured during the window. A determination is made as to whether a firing opportunity before the target firing opportunity is a skip or a fire and/or whether a firing opportunity after the target firing opportunity is a skip or a fire. Based at least in part on this skip/fire determination, a determination is made as to whether the target working chamber has misfired. In various embodiments, if the target working chamber is identified as persistently misfiring, the firing sequence is modified so that the target working chamber is deactivated and excluded from the firing sequence. In still other embodiments, a torque model is used to detect engine-related problems.

25 Claims, 4 Drawing Sheets

(51) Int. Cl.

| | |
|---|---|
| *F02D 19/06* | (2006.01) |
| *G01M 15/11* | (2006.01) |
| *F02D 41/22* | (2006.01) |
| *F02D 41/30* | (2006.01) |

(52) U.S. Cl.
CPC ........... *F02D41/3058* (2013.01); *G01M 15/11* (2013.01); *F02D 2200/025* (2013.01); *F02D 2200/101* (2013.01); *F02D 2200/1004* (2013.01); *F02D 2200/1012* (2013.01); *F02D 2200/1015* (2013.01); *F02D 2250/14* (2013.01)

(56) References Cited

U.S. PATENT DOCUMENTS

| | | | |
|---|---|---|---|
| 4,509,488 | A | 4/1985 | Forster et al. |
| 5,278,760 | A | 1/1994 | Ribbens et al. |
| 5,337,720 | A | 8/1994 | Murakami et al. |
| 5,377,631 | A | 1/1995 | Schechter |
| 5,490,486 | A | 2/1996 | Diggs |
| 5,537,963 | A | 7/1996 | Hasebe et al. |
| 5,581,022 | A | 12/1996 | Sprague et al. |
| 5,584,281 | A | 12/1996 | Katoh |
| 5,734,100 | A | 3/1998 | Kishimoto et al. |
| 5,753,804 | A | 5/1998 | La Palm et al. |
| 5,775,298 | A * | 7/1998 | Haller ................ F02D 41/0087 123/406.27 |
| 5,796,261 | A | 8/1998 | Golab |
| 5,803,040 | A | 9/1998 | Biesinger et al. |
| 6,006,157 | A | 12/1999 | Dai et al. |
| 6,023,651 | A | 2/2000 | Nakayama et al. |
| 6,158,411 | A | 12/2000 | Morikawa |
| 6,431,154 | B1 | 8/2002 | Inoue |
| 6,439,176 | B1 | 8/2002 | Payne et al. |
| 6,494,087 | B2 | 12/2002 | Daicho et al. |
| 6,584,951 | B1 | 7/2003 | Patel et al. |
| 6,591,666 | B1 | 7/2003 | Kacewicz et al. |
| 6,615,776 | B1 | 9/2003 | Von Andrian-Werburg |
| 6,619,258 | B2 | 9/2003 | McKay et al. |
| 6,655,353 | B1 | 12/2003 | Rayl |
| 6,752,004 | B2 | 6/2004 | Inada et al. |
| 6,752,121 | B2 | 6/2004 | Rayl et al. |
| 6,782,865 | B2 | 8/2004 | Rayl et al. |
| 7,025,035 | B1 | 4/2006 | Duty et al. |
| 7,063,062 | B2 | 6/2006 | Lewis et al. |
| 7,066,136 | B2 | 6/2006 | Ogiso |
| 7,086,386 | B2 | 8/2006 | Doering |
| 7,314,034 | B1 | 1/2008 | Waters et al. |
| 7,357,019 | B2 | 4/2008 | Mc Donald |
| 7,395,813 | B2 | 7/2008 | Pagot |
| 7,484,484 | B2 | 2/2009 | Frincke et al. |
| 7,490,001 | B2 | 2/2009 | Izelfanane |
| 7,503,296 | B2 | 3/2009 | Rozario et al. |
| 7,503,312 | B2 | 3/2009 | Surnilla et al. |
| 7,546,827 | B1 | 6/2009 | Wade et al. |
| 7,577,511 | B1 | 8/2009 | Tripathi et al. |
| 7,595,971 | B2 | 9/2009 | Ganev et al. |
| 7,757,657 | B2 | 7/2010 | Albertson et al. |
| 7,762,237 | B2 | 7/2010 | Gibson et al. |
| 7,819,096 | B2 | 10/2010 | McConville et al. |
| 7,854,215 | B2 | 12/2010 | Rozario et al. |
| 7,900,509 | B2 | 3/2011 | Feldkamp et al. |
| 7,908,913 | B2 | 3/2011 | Cinpinski et al. |
| 7,918,210 | B2 | 4/2011 | Gibson et al. |
| 7,921,709 | B2 | 4/2011 | Doering et al. |
| 7,930,087 | B2 | 4/2011 | Gibson et al. |
| 7,942,039 | B2 | 5/2011 | Huber et al. |
| 7,946,262 | B2 | 5/2011 | Borraccia et al. |
| 8,006,670 | B2 | 8/2011 | Rollinger et al. |
| 8,091,412 | B2 | 1/2012 | Forte et al. |
| 8,099,224 | B2 | 1/2012 | Tripathi et al. |
| 8,103,433 | B2 | 1/2012 | Hartmann et al. |
| 8,181,508 | B2 | 5/2012 | Cinpinski et al. |
| 8,286,471 | B2 | 10/2012 | Doering et al. |
| 8,301,362 | B2 | 10/2012 | Buslepp et al. |
| 8,511,281 | B2 | 8/2013 | Tripathi et al. |
| 8,550,055 | B2 | 10/2013 | Ferch et al. |
| 8,601,862 | B1 | 12/2013 | Bowman et al. |
| 8,631,688 | B1 | 1/2014 | Rayl et al. |
| 8,666,641 | B2 | 3/2014 | Rollinger et al. |
| 8,667,835 | B2 | 3/2014 | Doering et al. |
| 8,826,891 | B2 | 9/2014 | Nishikiori et al. |
| 2001/0047792 | A1 | 12/2001 | Akazaki et al. |
| 2002/0121252 | A1 | 9/2002 | Payne et al. |
| 2005/0033501 | A1 | 2/2005 | Liu et al. |
| 2005/0150561 | A1 | 7/2005 | Flynn et al. |
| 2005/0199220 | A1 | 9/2005 | Ogiso |
| 2006/0129307 | A1 | 6/2006 | Yasui |
| 2009/0254262 | A1 | 10/2009 | Kweon et al. |
| 2010/0050993 | A1 | 3/2010 | Zhao et al. |
| 2010/0154738 | A1 | 6/2010 | Tsukamoto et al. |
| 2010/0286891 | A1 | 11/2010 | Huang et al. |
| 2010/0288035 | A1 | 11/2010 | Arakawa |
| 2011/0072893 | A1 | 3/2011 | Malaczynski |
| 2012/0109495 | A1 | 5/2012 | Tripathi et al. |
| 2012/0143471 | A1 | 6/2012 | Tripathi et al. |
| 2012/0173122 | A1 | 7/2012 | Nishikiori et al. |
| 2012/0285161 | A1 | 11/2012 | Kerns et al. |
| 2012/0310505 | A1 | 12/2012 | Morgan et al. |
| 2013/0325290 | A1 | 12/2013 | Pierik |
| 2014/0041624 | A1 | 2/2014 | Rayl et al. |
| 2014/0261317 | A1 | 9/2014 | Loucks et al. |

OTHER PUBLICATIONS

Written Opinion dated Jul. 8, 2014 from International Application No. PCT/US2014/026142.
International Search Report dated Dec. 22, 2014 from International Application No. PCT/US2014/055902.
Written Opinion dated Dec. 22, 2014 from International Application No. PCT/US2014/055902.
International Search Report dated Aug. 12, 2015 from International Application No. PCT/US2015/029098.
Written Opinion dated Aug. 12, 2015 from International Application No. PCT/US2015/029098.
International Search Report dated Jan. 27, 2016 from International Application No. PCT/US2015/055145.
Written Opinion dated Jan. 27, 2016 from International Application No. PCT/US2015/055145.

* cited by examiner

MISFIRE DETECTION SYSTEM

RELATED APPLICATIONS

This application claims priority of U.S. Provisional Patent Application Nos. 61/799,180 filed Mar. 15, 2013 and 61/897,686 filed Oct. 30, 2013, each of which is hereby incorporated by reference in their entirety for all purposes.

FIELD OF THE INVENTION

The present invention relates generally to powertrain diagnostics conducted during skip fire control of an internal combustion engine. Various embodiments pertain to a misfire detection system and methods to mitigate the impact of a misfiring working chamber.

BACKGROUND

Skip fire engine control is understood to offer a number of benefits including the potential of increased fuel efficiency. In general, skip fire engine control contemplates selectively skipping the firing of certain cylinders during selected firing opportunities. Thus, for example, a particular cylinder may be fired during one firing opportunity and then may be skipped during the next firing opportunity and then selectively skipped or fired during the next. This is contrasted with conventional variable displacement engine operation in which a fixed set of the cylinders are deactivated during certain low-load operating conditions.

When a cylinder is deactivated in a variable displacement engine, its valves are not actuated and although the piston typically still reciprocates, fuel is not combusted during the power stroke. Since the cylinders that are "shut down" don't deliver any net positive torque, the proportionate load on the remaining cylinders is increased, thereby allowing the remaining cylinders to operate at an improved thermodynamic efficiency. With skip fire control, cylinders are also preferably deactivated during skipped working cycles in the sense that air is not pumped through the cylinder and no fuel is delivered and/or combusted during skipped working cycles when such valve deactivation mechanism is available. Often, no air is introduced to the deactivated cylinders during the skipped working cycles thereby reducing pumping losses. However, in other circumstances it may be desirable to trap exhaust gases within a deactivated cylinder, or to introduce, but not release air from a deactivated cylinder during selected skipped working cycles. In such circumstances, the skipped cylinder may effectively act as a gas spring. Although deactivating skipped cylinders is generally preferred, it should be appreciated that in some engines or during some working cycles it may not be possible, or in some situations desirable, to truly deactivate cylinders. When a cylinder is skipped, but not deactivated, intake gases drawn from the intake manifold are effectively pumped through the cylinder during the skipped working cycle.

Although the concept of skip fire control has been around for a long time, it has not traditionally been used in commercially available engines, so an additional challenge to implementing skip fire control is insuring that the engine's other engine/power train systems work effectively during skip fire control. One such system relates to engine diagnostics. As is well understood by those familiar with the art, modern vehicles incorporate engine management systems that perform in-situ diagnostics on various powertrain and vehicle component during vehicle operation. These diagnostic systems are often referred to as "On-Board Diagnostics" (OBD) systems and there are a number of engine diagnostic protocols that are performed while the engine is running Modern OBD systems store and report a significant amount of information concerning the operation and state of health of various vehicle sub-systems including the powertrain. For example, some OBD systems are arranged to detect a situation in which a cylinder misfires i.e., when the cylinder fails to fire or there is incomplete combustion in the cylinder.

Although prior art OBD systems are well suited to detect misfire in a conventional all-cylinder engine control system, they are generally ill suited for use in a skip fire engine control system. Also, the inability to deactivate a cylinder in a conventionally controlled engine limits possible mitigation methods. For example, one state of the art mitigation method in a conventionally controlled engine is to stop fueling the misfiring cylinder. This eliminates the misfire problem (a non-fueled cylinder cannot misfire), but the misfiring cylinder pumps air into the catalytic converter reducing its ability to scrub undesirable $NO_x$ from the exhaust gases. The present invention contemplates various arrangements, methods and techniques for detecting misfire in an engine operated in a skip fire manner.

SUMMARY

A variety of methods and arrangements for detecting misfire in a skip fire engine control system are described. In one aspect, a window is assigned to a target firing opportunity for a target working chamber. In various embodiments, the window is related to the rotation of the crankshaft. A change in an engine parameter (e.g., crankshaft angular acceleration or another crankshaft-related parameter) is measured during the window. A determination is made as to whether a firing opportunity before the target firing opportunity is a skip or a fire and/or whether a firing opportunity after the target firing opportunity is a skip or a fire. Based at least in part on this skip/fire determination and the engine parameter measurement, a determination is made as to whether the target working chamber has misfired. In various embodiments, if the target working chamber is identified as persistently misfiring, the firing sequence is modified so that the target working chamber is deactivated and excluded from the firing sequence.

The misfire detection method may vary widely, depending on the needs of a particular application. In some embodiments, for example, the aforementioned skip/fire determination also involves determining whether a firing opportunity associated with the opposing working chamber (i.e., the working chamber that opposes the target working chamber during the window) is a skip or a fire. In still other embodiments, the misfire detection method takes into account additional or different firing opportunities for other working chambers.

In another aspect, a method for determining misfire using a torque model is described. A window is assigned to a target firing opportunity. A determination is made as to whether various firing opportunities are skips or fires. Each firing opportunity is associated with a different one of the available working chambers. A torque model is provided that helps indicate expected engine torque generated by the working chambers. The torque model is based at least in part on the above skip/fire determination. An engine parameter (e.g., crankshaft angular acceleration) is measured during the window. A determination is made as to whether misfire has occurred based on the measured engine parameter and the torque model. In various embodiments, other engine problems, such as an error in the setting of the spark advance, are detected in addition to or instead of misfire.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

Figure 1:
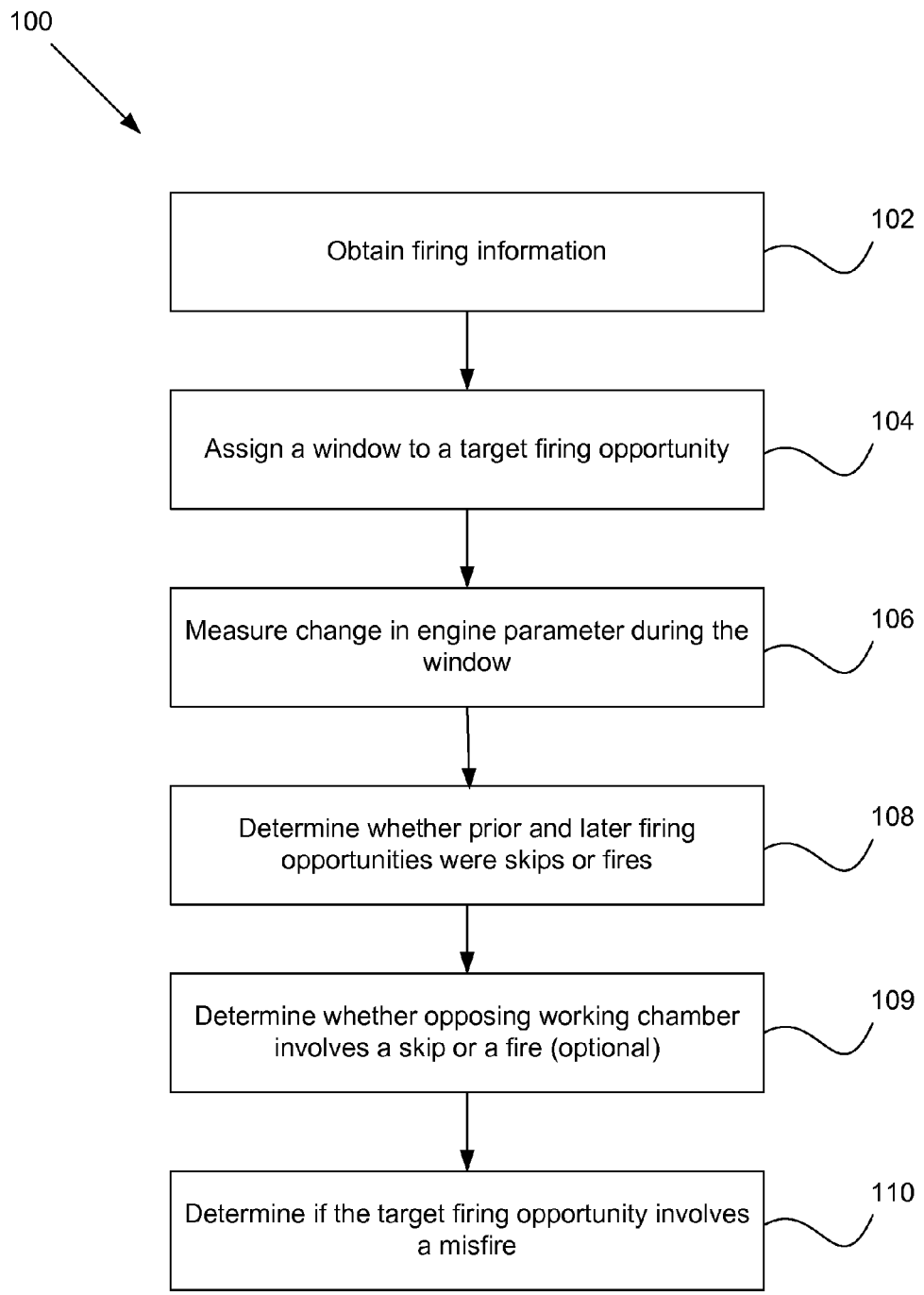
FIG. 1 is a flow diagram illustrating a method of detecting misfire in a skip fire engine control system according to a particular embodiment of the present invention.

The present invention relates to a misfire detection system. More specifically, the present invention relates to various techniques and arrangements for detecting misfire in skip fire engine control systems and methods to mitigate the impact of a misfiring working chamber.

As noted in the background, prior art misfire detection systems are generally not suitable for detecting misfire in a skip fire engine control system. For example, various prior art misfire detection systems detect unexpected changes in the rotation speed of the crankshaft and use this to determine if a misfire has occurred. This works well in conventional, all cylinder engine operation, since it is expected that crankshaft acceleration will remain generally consistent. Although there are some variations in crankshaft acceleration from one firing to the next, the crankshaft acceleration peaks and profiles remain generally consistent in size and shape, in large part due to the fact that every cylinder is being fired. Thus, when a significant deviation in crankshaft acceleration is detected with respect to the firing of a particular cylinder, the misfire detection system may determine that the cylinder has misfired.

In skip fire engine operation, however, any working chamber or working cycle may be skipped. That is, a particular working chamber might be fired during one working cycle, skipped during the next, and fired or skipped during the next. As a result, the crankshaft acceleration peaks and profiles may abruptly change as the firing sequence changes, even though all working chambers are properly firing, i.e. no misfires. Unlike in prior art misfire detection systems, any substantial drop in crankshaft acceleration cannot be assumed to indicate a misfire, since in a skip fire engine control system, selected working cycles may be skipped at almost any time, each of which may also result in a drop in the crankshaft acceleration.

Conventional misfire determination systems also do not properly take into account the effect that the firing or skipping of various working chambers have on a measurement of crankshaft acceleration in a skip fire engine control system. To illustrate this point, consider an example in which a designated cylinder is examined for a possible misfire. Combustion takes place in the designated cylinder during an assigned window (e.g., during at least part of the combustion stroke for the designated cylinder.) The crankshaft acceleration is measured during that window. If the crankshaft acceleration dips below a predetermined threshold, it is determined that a misfire has occurred in the designated cylinder.

In skip fire engine operation, the accuracy of the misfire determination is improved if the misfire determination system and/or the misfire threshold takes into account the impact of the skipping or firing of other cylinders on the measured crankshaft acceleration. That is, the system should take into account the firing commands (i.e., skip or fire) for other cylinders that were executed prior to the window or will be executed after the window. It should be noted that while the firing of the designated cylinder may make the largest contribution to the crankshaft acceleration during the window, there are a number of other factors that affect crankshaft torque. For example, it requires energy to compress the intake air during the compression stroke and that energy comes from the crankshaft thereby acting as a negative torque on the crankshaft. Engines having multiple cylinders are generally designed with their working cycles out of phase with one another at consistent intervals so that the compression of one cylinder occurs while combustion is occurring in another cylinder. In normal, all cylinder operation, the torque generated by each firing, the torque required by each compression stroke, and other engine generated torques tend to be relatively constant during steady state operation. Therefore, the even spacing of the cylinder phases tend to result in each cylinder being affected in much the same way by events occurring in the other cylinders, which helps contribute to the consistency between the peaks and profiles associated with each firing opportunity during normal all-cylinder operation.

In skip fire operation, the effect of the other cylinders will not always be so consistent. For example, in some implementations the valves may be operated in a manner in which the intake and exhaust valves are opened in the normal sequence during "fired" working cycles and are both held closed through skipped working cycles. This will result in the forces applied to the crankshaft during each stroke of the working cycle being different during a skipped working cycle than would be seen during a fired working cycle. Most notably, during a skipped working cycle in which low pressure exhaust trapping is used, only a small amount of residual exhaust gases will remain in the cylinder and therefore the torque imparted during the compression stroke in a skipped working cycle will be quite different than the torque imparted during active (fired) working cycles because the relatively large negative torques required for compression of the intake gases will be missing during skipped working cycles. Since the compression stroke associated with one cylinder will typically overlap with the combustion stroke of another, the net torque experienced by the crankshaft during any particular combustion event will be affected by the firing decisions of other cylinders. Although the compression stroke tends to have greatest impact, the differential torques experienced during the intake and exhaust strokes may also be different in significant ways. For example, holding the intake valve closed during the skipped working cycle may cause a very low pressure to be developed in the cylinder during intake thereby imparting a larger negative torque during the intake stroke of a skipped working cycle than would occur during intake of an active (fired) working cycle.

Still further, different skip fire controllers may have different valve actuation schemes and/or may use a combination of different valve actuation schemes and such valve actuation schemes can further affect the torque variations experienced by the crankshaft. For example, if an exhaust valve is not opened after a combustion event, a "high pressure exhaust gas spring" may effectively be created within the cylinder combustion chamber by the combustion gases and the timing of the exhaust valve opening may be delayed from immediately after the combustion event to a later working cycle. Such a high pressure spring will have a significant impact on the torque applied during all of the other strokes. In another example particularly relevant to direct injection engines, an intake valve may be opened in a working cycle in which no fueling or combustion occurs so that an air charge is trapped within the combustion chamber during a skipped working cycle. Such events will affect the net torque in yet another way. In still other circumstances sometimes referred to as "re-exhaust" it may be desirable to open the exhaust valve in the normal course after the firing of a cylinder and then to reopen the exhaust valve in a subsequent skipped working cycle such as the one that immediately precedes an active (fired) working cycle resulting in an extra exhaust valve opening event. In still other implementations, re-exhaust may be employed at the end of every skipped working cycle. Of course, a variety of other valve actuation schemes may be applied as well and it should be apparent that the timing and magnitude of the forces applied to the crankshaft will depend on the state of all of the cylinders.

The present invention contemplates various techniques for taking into account at least some of the above factors in making a misfire determination in a skip fire engine control system. A particular embodiment contemplates a misfire detection system that detects misfires based on an examination of at least three firing opportunities. That is, to determine whether a target working chamber has misfired during a target firing opportunity, the misfire detection system determine whether the firing opportunities before and after the target firing opportunity were skips or fires. In some embodiments, additional or other firing opportunities are taken into account (e.g., whether the opposing working chamber is skipped or fired.) Depending on this skip/fire determination, different criteria are used to verify that a misfire has occurred. This approach allows the misfire detection system to reduce false positives and more accurately determine when a misfire has taken place.

Figure 2:
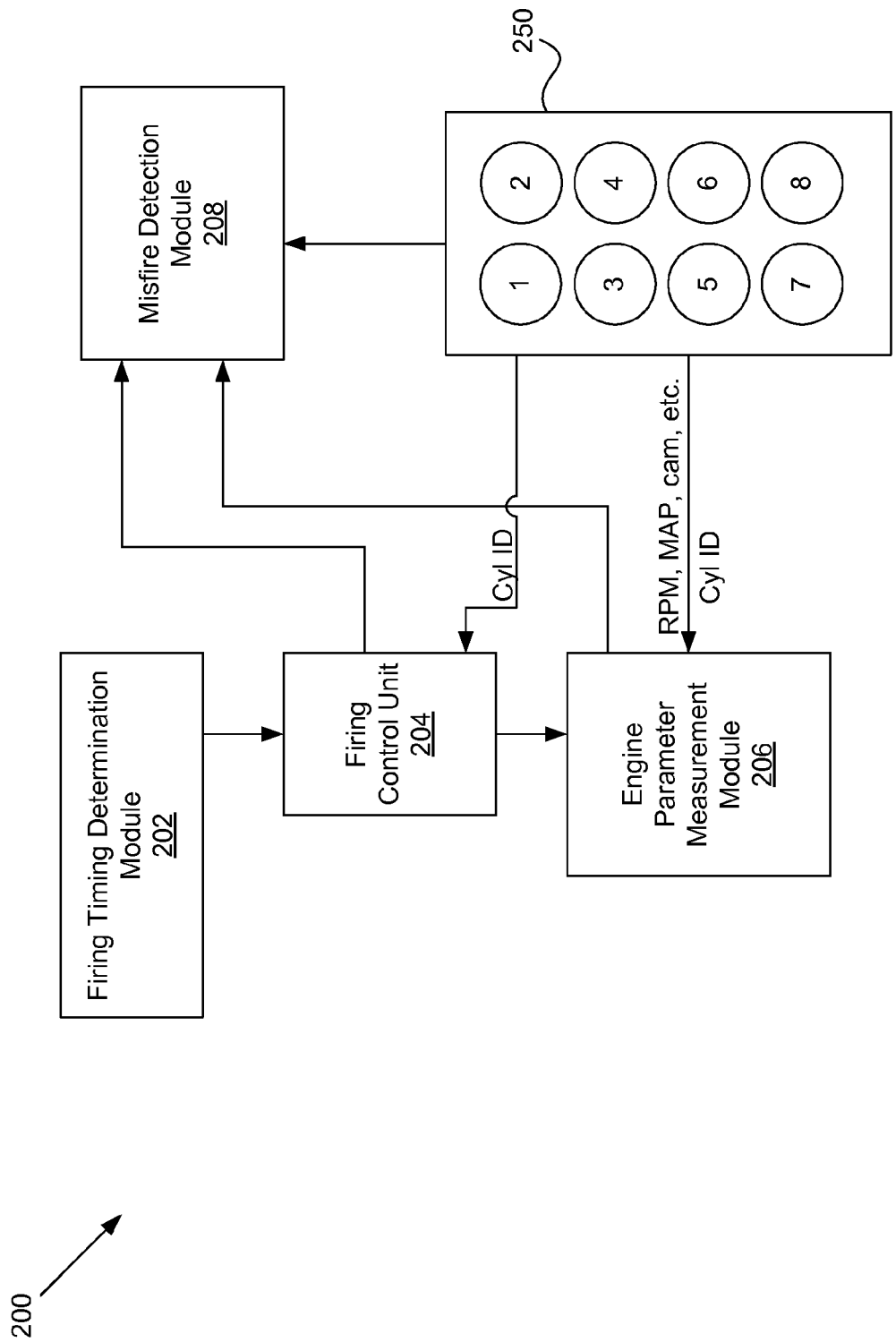
FIG. 2 is a block diagram of a misfire detection system according to a particular embodiment of the present invention.

Referring initially to FIGS. 1 and 2, a method for a misfire detection system according to a particular embodiment of the present invention will be described. FIG. 1 is a flow diagram illustrating a method 100 for detecting misfire in a skip fire engine control system. The method is implemented in the misfire detection system 200 illustrated in FIG. 2. The misfire detection system 200 includes a firing timing determination module 202, a firing control unit 204, an engine parameter measurement module 206, a misfire detection module 208, and an engine 250. FIG. 2 illustrates an engine 250 having eight cylinders, labeled 1 through 8, as the working chambers. Although engine 250 is shown having 8 cylinders arranged in two banks, engines having different numbers of cylinders arranged in different configurations may be used. Also, although a variety of discrete modules are illustrated in FIG. 2, it should be appreciated that in various embodiments, the modules may be combined and/or operations of one module may instead be handled by another module.

Initially, in step 102 of FIG. 1, firing information is obtained by the firing timing determination module 202 and/or the firing control unit 204. The firing timing determination unit 204 is arranged to issue a sequence of firing commands used to operate the engine 250 in a skip fire manner and deliver a desired torque and/or firing fraction. The skip fire firing sequence may be determined in a wide variety of ways.

For example, the firing sequence may be generated using a sigma delta converter or any suitable control algorithm. In some embodiments, the firing sequence is selected from a library of predefined firing sequences. The sequence of firing commands is transferred to the firing control unit 204.

The firing control unit 204 is arranged to orchestrate the firings of the working chambers of the engine 250 using the received firing sequence. The firing control unit 204 receives data identifying suitable working chambers from any suitable source (e.g., the engine 250) and matches a selected working chamber to each firing command. Consider a simple example in which the firing control unit receives a short firing sequence of 0-1-0-0 from the firing timing determination unit, which indicates a skip, fire, skip and a skip, respectively. In this example, the engine may be configured so that the cylinder firing opportunities are arranged in a repeating sequence of 1-8-7-2-6-5-4-3. That is, the first cylinder to have a firing opportunity may be cylinder 1, followed by cylinder 8, and then cylinder 7, etc. The firing control unit 204 determines which cylinders should be matched to each firing command (e.g., it may determine that cylinders 1, 8, 7 and 2 should be skipped, fired, skipped and skipped, respectively, in accordance with the sequence.) The present invention contemplates using such firing information (i.e., the firing sequence and the identities or numbers of the corresponding working chambers) to help detect misfires. Note that the fire/skip information is typically available before execution of a firing/skip command, since time is needed to fuel the cylinder and activate/deactivate the valves.

At step 104 of FIG. 1, the engine parameter measurement module 206 assigns windows to each firing opportunity. The window may be any suitable time period or interval that corresponds to a target firing opportunity of a target working chamber. A particular engine parameter will later be measured across the window to help determine if a misfire has occurred. The characteristics of the window may differ depending on the type of engine parameter measurement.

In one embodiment, for example, the engine parameter to be measured is crankshaft angular acceleration. The crankshaft angular acceleration tends to increase when combustion occurs in the target working chamber. As a result, a suitable window may be one that covers at least part of the power stroke for the target working chamber. In various embodiments, the sum of the expected individual cylinder torques can be correlated to an expected crankshaft acceleration or other engine parameter to provide thresholds used to determine if the target firing opportunity is a misfire in step 110 of FIG. 1.

In another embodiment, the engine parameter to be measured is exhaust gases. That is, one or more sensors in the exhaust system detect levels of oxygen or other components in an exhaust gas "pulse" that is generated during the firing opportunity. This analysis is used to help determine whether a misfire has occurred. This measurement may occur over a different window. Since exhaust gases are involved, the appropriate window may cover or correspond to at least a portion of the exhaust stroke of the target working chamber. Additionally, the window may also incorporate an offset to account for the time needed for the corresponding exhaust "pulse" to traverse from the exhaust valve to the exhaust sensor. Generally, the window may vary widely, depending on the characteristics of the misfire detection system 200. The exhaust sensor method of sensing misfires may be combined with the crankshaft acceleration method and other possible means of misfire detection.

Figure 3:
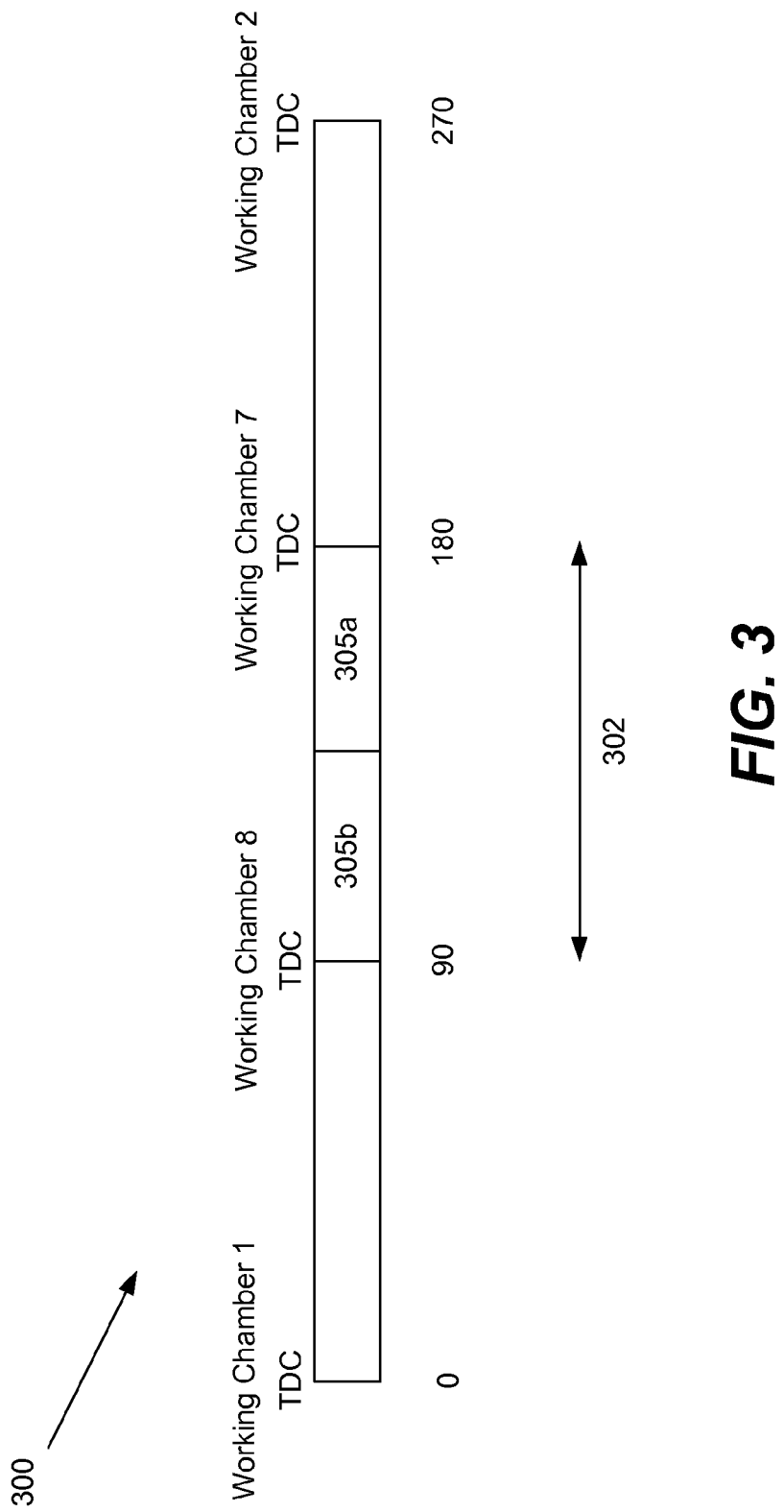
FIG. 3 is a block diagram of firing opportunities and associated angular window segments according to a particular embodiment of the present invention.

An example of an association between windows and firing opportunities for a corresponding working chamber is illustrated in FIG. 3. In this example, a total of 270° of rotation for the crankshaft of an eight cylinder, four-stroke engine is shown. During the rotation, there are three firing opportunities, corresponding to the firing or skipping of working chambers 1, 8 and 7. A window is assigned to each of the firing opportunities and working chambers. Each window is an angular window segment that corresponds to a 90° rotation of the crankshaft. FIG. 3 illustrates an example angular window segment 302, which corresponds to a firing opportunity for working chamber 8. The angular window segment 302 begins at or around the time the piston for the corresponding working chamber reaches top dead center (TDC) (e.g., at the beginning of a power stroke in a four stroke engine.) It should be appreciated that the above example is used for illustrative purposes and that the characteristics of the windows and the way in which they are assigned may vary for different applications. For example, it should be appreciated that windows longer or shorter than 90° rotation of the crankshaft rotation may used. The length of the window may vary with the number of cylinders in the engine. For example, longer windows may be used in engines with fewer cylinders, since there are fewer firing opportunities per engine revolution. Also, the time windows associated with each cylinder may overlap.

Returning to the flow diagram of FIG. 1, the engine parameter measurement module 206 measures a change in an engine parameter during the corresponding window (step 106 of FIG. 1) This measurement may be obtained, for example, using one or more sensors (e.g., a crankshaft position sensor, an exhaust gas sensor, etc.) The engine parameter measurement module 206 receives any input or engine parameter needed to perform the measurement, e.g. engine speed data, cylinder identity information, firing information from the firing timing determination module 202/firing control unit 204, etc. A variety of different engine parameters may be measured during the window. In some embodiments, for example, a crankshaft-related parameter or crankshaft angular acceleration is measured.

Below is one example formula for calculating crankshaft angular acceleration for the angular window segment 302 of working chamber 8 as shown in FIG. 3. In FIG. 3, the angular window segment 302 is divided into two subsegments, earlier subsegment 305b and later subsegment 305a. The example formula is as follows:

$$CrankshaftAngularAcceleation = \frac{AvgSpeed(305a) - AvgSpeed(305b)}{\Delta Time(305ab)}$$

where the AvgSpeed (305a) and AvgSpeed (305b) are the average velocities of the crankshaft over subsegments 305a and 305b, respectively, and ΔTime (305ab) refers to the time needed for the crankshaft to rotate from the midpoint of subsegment 305b to the midpoint of subsegment 305a. While the subsegments 305a and 305b are shown as having equal duration, this need not be the case. Also, the subsegments 305a and 305b need not be continuous, i.e. there may be a gap between the segments. The timing of the subsegments relative to the crankshaft rotation may be adjusted depending on the engine operating conditions and the misfire detection algorithm. In some cases more than two subsegments may be used. The subsegment durations and timing may vary depending on the engine operating conditions. The average engine speed may be determined by measuring the lapsed time between reference marks on the crankshaft passing a fixed reference point. The crankshaft reference marks may be equally distributed around the crankshaft at approximately 6 degree intervals. The raw signal from crank may be processed to calculate the average speed in a subsegment, acceleration between subsegments, and the jerk (change in acceleration between pairs of subsegments). In various embodiments, measurement of jerk requires use of a least three subsegments, so that a change in acceleration may be measured. Higher order time derivatives of acceleration may also be used in misfire determination, with a concomitant increase in the number of subsegments. Various filtering algorithms may be applied to the crank signal to improve the accuracy of all these measurements. Generally, the calculation of engine parameter change is performed for multiple firing events for each working chamber. Thus, the engine parameter measurement module builds a history of firing events for each working chamber, as well as corresponding engine parameter changes (e.g., crankshaft angular acceleration data) for the working chamber. This data is later used to help determine whether a particular working chamber is misfiring or not.

A variety of engine parameters may be measured in step 106. In some embodiments, as noted above, a crankshaft-related parameter, such as the crankshaft angular acceleration or its derivative (jerk), may be measured. In other embodiments, the engine parameter measurement involves an analysis of exhaust gases. For example, as previously discussed, various designs involve measuring a change in an amount of oxygen in the exhaust of the engine over a corresponding window or period of time. This change is associated with a particular target firing opportunity of a target working chamber. Such changes can provide insight into whether the target working chamber has misfired.

The misfire detection module 208 receives the firing information from the firing control unit 204 and/or the firing timing determination module 202 and the above engine parameter measurement data from the engine parameter measurement module 206. The misfire detection module 208 uses information regarding engine parameters, such as speed (RPM), manifold absolute pressure (MAP), cam position, spark timing, etc. to help determine thresholds for misfire detection. The misfire detection module 208 also uses the firing information to determine, for each firing opportunity, whether firing opportunities that precede and follow the target firing opportunities are skips or fires (step 108). This operation is referred to herein as a skip/fire determination.

The skip/fire determination involves an examination of at least one firing opportunity that precedes the target firing opportunity and at least one firing opportunity that follows the target firing opportunity. The numbers and identities of firing opportunities and working chambers that are examined may vary widely, depending on the needs of a particular application. In various implementations, for example, the firing opportunities that immediately precede and immediately follow the target firing opportunities are examined to determine whether skips or fires occurred.

In another embodiment, the skip/fire determination also involves making a determination as to whether the opposing working chamber involves a skip or a fire (step 109). The opposing working chamber may be described as follows. Consider, for example, a four stroke engine, in which the two engine revolutions take place for every engine cycle. In such a design, when a target firing opportunity is available at a target working chamber (e.g., when the piston for the target working chamber is at TDC at the beginning of a power stroke), there is another working chamber whose piston is generally in the same position (e.g., the piston for another working chamber is also at TDC). This other working chamber may be referred to as the opposing working chamber i.e. the working chamber that opposes the target working chamber during the assigned window. In this example involving a four stroke engine, the opposing working chamber is one revolution away or 360 degrees apart from the target working chamber and is at the beginning of an intake stroke.

In various embodiments, it is desirable to take into account whether the firing opportunity for the opposing working chamber is a skip or a fire. The skipping or firing of the opposing working chamber can substantially influence the crankshaft angular acceleration or another engine parameter measured at step 106. For instance, in the above example, if the firing opportunity associated with the opposing working chamber is a fire, the opposing working chamber will draw in air during the intake stroke while combustion takes place in the target working chamber. However, if the firing opportunity associated with the opposing working chamber is a skip, the intake valve may be sealed. Thus, during the intake stroke, the piston of the opposing working chamber will pull against a vacuum, which tends to subtract torque from the crankshaft and help reduce the crankshaft angular acceleration. Some embodiments contemplate taking this into account when determining whether a misfire has occurred in the target working chamber.

In still other implementations, all firing opportunities over a complete engine cycle, i.e. 720° of crankshaft rotation, both before and after the target firing opportunity may be used to establish the misfire thresholds. Put another way, assuming that the misfire determination for a target working chamber is based on a measurement of an engine parameter (e.g., crankshaft angular acceleration) during an assigned window, the misfire determination and/or the misfire threshold can be based at least in part on the firing commands for all other working chambers, each of which is executed before or after the window. This type of control may be more appropriate for engines having a lower cylinder number, such as 3 and 4 cylinder engines. In other cases the firing opportunities considered may be temporally separated. For example, the firing opportunity immediately prior, immediately after, and 360° after may be used to determine the misfire thresholds. These types of patterns may be useful, since during the power stroke of the cylinder associated with the target firing opportunity other cylinders may be adding or subtracting torque from the crankshaft and thus impacting the measured crankshaft acceleration.

The skip/fire determination may be performed in a wide variety of ways, depending on the needs of a particular application. In some embodiments, for example, each firing event is categorized based on the skip/fire determination. Some example groupings are provided below in Chart A:

CHART A

| Group number | Group Description |
|---|---|
| 1 | Fire before target firing event, fire after |
| 2 | Fire before target firing event, skip after |
| 3 | Skip before target firing event, fire after |
| 4 | Skip both before and after target firing event |

That is, in this example, each firing event is associated with one of the above groups, depending on whether firing opportunities that immediately precede and follow the firing event were skips or fires.

Temporally adjacent skips and fires can have a substantial effect on the measured crankshaft angular acceleration for a particular firing event. The described embodiment thus takes this skip/fire pattern into account in determining whether a misfire has occurred. Consider the example in FIG. 3, which illustrates three firing opportunities for working chambers 1, 8 and 7. The crankshaft angular acceleration is measured along an angular window segment 302, which covers 90 degrees of rotation of the crankshaft, starting from when the piston of working chamber 8 is at top dead center (TDC). Thus, the angular window segment 302 corresponds to a portion of the power stroke of working chamber 8.

The rotation of the crankshaft during the angular window segment 302 may be further accelerated, depending on how working chamber 1 is operated. The firing opportunity of working chamber 1 comes immediately before that of working chamber 8. Assuming that a four-stroke, eight cylinder engine is used, working chamber 1 is still in the second half of its power stroke during the angular window segment 302, which covers the first half of the power stroke of working chamber 8. If working chamber 1 was fired rather than skipped, the combustion will tend to accelerate the rotation of the crankshaft during the angular window segment 302.

The operation of working chamber 7, whose firing opportunity comes immediately after that of working chamber 8, can also affect the measured crankshaft angular acceleration. During the angular window segment 302, working chamber 7 is in its compression stroke. If, for example, working chamber 7 is to be fired, an intake valve is opened to allow air to flow into the working chamber. During the compression stroke, the piston compresses the air, which can take torque away from the crankshaft during the angular window segment 302. On the other hand, if working chamber 7 is instead skipped, deactivated and sealed, such effects are largely absent.

The inventors have performed multiple experiments, which help indicate the effect that temporally adjacent skip-fire patterns can have on the crankshaft angular acceleration associated with a particular firing event. The results of one experiment, which uses the aforementioned group numbers 1-4, are provided below in Chart B:

CHART B

| Group number | Lower mean crankshaft angular acceleration (deg/s/s) | Upper mean crankshaft angular acceleration (deg/s/s) |
|---|---|---|
| 1 | −14,010 | 12,824 |
| 2 | −6,409 | 35,874 |
| 3 | 2000 | 26,836 |
| 4 | 18,828 | 70,139 |

Chart B reflects multiple crankshaft angular acceleration measurements for multiple firing opportunities at a fixed rpm, particular air/fuel charge, air/fuel ratio, and spark timing. In general the acceleration values will vary based on these parameters. These firing events are sorted based on their respective skip/fire determinations i.e., surrounding skip/fire patterns. An analysis of the results of the experiments has generated mean values for the crankshaft angular acceleration associated with a cylinder firing and a complete misfire. That is, the lower mean column in the chart refers to the average acceleration in a case in which the target firing event involves a complete misfire i.e., little or no combustion took place. The upper mean column refers to the average acceleration in a case in which the target firing event involves a "full" firing i.e., in which full combustion took place. The above chart indicates how these values can differ substantially depending on whether skips or fires precede and follow the target firing opportunity. For example, if the target firing opportunity is preceded by a fire and followed by a fire (group 1), then a misfire with little or no combustion can involve a crankshaft angular acceleration of −14,010 degrees/s/s. However, if the target firing opportunity is preceded by a skip and followed by a skip (group 4), then a misfire with little or no combustion may involve a crankshaft angular acceleration as high as 18,828 degrees/s/s. In general, cases where the target window is followed by a skip have higher acceleration values, since an air/fuel mixture is not being compressed in preparation for a power stroke. In various embodiments, the threshold or trigger point value for determining a misfire (which can involve both incomplete combustion as well as an absence of combustion) will be somewhere between the upper and lower bounds. The chart makes clear that this misfire threshold value will vary, depending on the skip/fire pattern surrounding the target firing event. Of course, it should be appreciated that the above Chart B provides only preliminary results of a single experiment, and the numbers, thresholds and groupings may be subject to further adjustment and adaptation for different engine settings, such as rpm, air/fuel ratio, charge, spark timing and engine designs.

Charts A and B assume that the firing opportunities to be considered in a skip/fire determination (step 108 of FIG. 1) are the firing opportunities that are temporally adjacent to the target firing opportunity (i.e., the firing opportunities that immediately precede and follow the target firing opportunity.) However, the skip/fire determination can also take into account a different set of relevant firing opportunities. As previously discussed, in some embodiments, for example, this set also includes the firing opportunity for the working chamber that opposes the target working chamber. In still other embodiments, this set includes the firing opportunities of some or all of the other working chambers. Charts A and B can be adjusted for any suitable set of relevant firing opportunities. That is, in various embodiments, a suitable number of groups are established (e.g., as in Chart A) to cover all possible combination of skips and fires for the relevant set of firing opportunities. Misfire thresholds are determined for each group (e.g., as in Chart B.) A skip/fire determination (e.g., steps 108 and 109 of FIG. 1) is made for a particular target firing opportunity, which determines whether each firing opportunity in the relevant set is a skip or a fire.

Once the relevant skip/fire pattern for each target firing opportunity is known, the pattern and the engine parameter measurement data is used to determine whether a target working chamber has misfired during a target working cycle (step 110 of FIG. 1). This determination can be performed in a wide variety of ways. In some embodiments, for example, multiple different misfire thresholds are obtained or provided (e.g., as seen in Chart B above.) Generally, each misfire threshold can differ depending on the skip/fire determination (e.g., there could be four or more different misfire thresholds, one for each of the aforementioned groups.) The skip/fire determination for the target firing opportunity is used to select or obtain one of these misfire thresholds. As previously noted, each target firing opportunity is associated with a window. If the measured engine parameter change during the associated window exceeds the selected misfire threshold, it is determined that a misfire has or may have taken place.

The misfire threshold may be determined in a wide variety of ways. In one implementation, for example, predetermined misfire threshold values are found in one or more lookup tables. The misfire detection module 208 selects a suitable misfire threshold for a target firing event based on its surrounding skip/fire pattern. The determination of the misfire threshold can be based on a variety of other engine parameters as well, including additional skip/fire events, a firing fraction, a firing history for the working chamber, air charge, engine speed and other engine settings.

In another embodiment, the misfire threshold takes into account vibration impact. That is, at certain engine speeds, cylinder loads and/or firing fractions, a skip fire engine system can generate undesirable vibration. In some cases, such vibration can affect the measurement of the engine parameter (e.g., step 106 of FIG. 1) used to determine whether a misfire has occurred. Some implementations contemplate adjusting any misfire thresholds based on a vibration impact model, which takes into account engine speed, cylinder load, skip fire firing fraction and/or any other suitable parameter that is related to or influences engine vibration.

In still other embodiments, the misfire threshold is determined dynamically. In other words, the misfire detection module 208 is arranged to calculate expected changes in an engine parameter (e.g., crankshaft angular acceleration) for each firing event and/or for each type of surrounding skip/fire pattern (e.g., such as groups 1, 2, 3 and 4 described above.) These expected values may vary from time to time, depending on a variety of factors such as engine speed, fuel change, mass air charge, firing sequence, spark advance and other parameters. Based on the expected values, the misfire detection module also dynamically calculates misfire detection thresholds for each firing event and/or surrounding skip/fire pattern type.

Once a suitable misfire threshold for a target firing event is known, a determination is made as to whether the engine parameter change (e.g., crankshaft angular acceleration) for the target firing event exceeds the misfire threshold. (It should be noted that the term, "exceed," as used in this application, means "go beyond" and may involve a value that is higher or lower than the threshold value, depending on the metric.) The reaching of the threshold indicates or helps indicate that the working chamber has misfired.

Generally, multiple firing events are monitored in order to confirm that a working chamber has misfired. In some embodiments, for example, the above misfire detection techniques are executed for many, almost all, or all firing events. That is, each firing event and its corresponding skip/fire determination (i.e., surrounding skip-fire pattern) are analyzed and/or stored. Additionally, the engine parameter changes for each firing event are also measured and/or stored. This information is used to build a database of firing events, in which each firing event is associated with a particular working chamber, engine parameter change measurement, a particular skip/fire determination, a corresponding misfire threshold and/or a flag indicating whether a corresponding misfire threshold was exceeded. Thus, the misfire detection system 200 stores a history for each working chamber that indicates the number of firing events in which the misfire threshold was exceeded. In some embodiments, if a particular working chamber is associated with multiple firing events of which a predetermined percentage or number involves the exceeding of a misfire threshold, a determination is made that the working chamber is misfiring and the appropriate error signal is communicated to the vehicle driver via the OBD system, typically a malfunction indicator lamp on the vehicle dashboard. An appropriate error code may also be sent to the OBD interface for subsequent diagnostic evaluation.

The above techniques can be used for a variety of applications. In various embodiments, the illustrated misfire detection control system is stored in an engine control unit of a vehicle and/or is part of an onboard diagnostics system. In other embodiments, it may be stored in an external diagnostic device that is used to examine the performance of an engine. Any of the aforementioned modules, systems and operations may be stored in the form of hardware, software or both.

The present invention also contemplates operations that respond to and are based on the finding of a misfire. In some embodiments, for example, if a working chamber is determined to be misfiring, the firing control unit 204 is arranged to skip and/or deactivate the working chamber. One reason for doing this is that a misfiring working chamber generates unburned hydrocarbons, which can enter into and damage a catalytic converter. In some embodiments, after a predetermined period of time, the working chamber is reactivated and occasionally fired to see if the misfire continues. After resuming operation of the misfiring working chamber, the aforementioned techniques are used again to determine if the working chamber has resumed normal operation or is misfiring again. In still other embodiments, when a working chamber is determined to be misfiring, an alert is displayed on a dashboard of a vehicle so that the driver is aware of the problem.

Although misfiring working chambers can be skipped to prevent damage to the catalytic converter, one other concern, however, is that if the working chamber is routinely skipped, the firings in the remaining working chambers may not be evenly spaced, which means that NVH (noise, vibration, and harshness) may be worse. This can particularly be an issue in engine control systems that utilize an algorithm to dynamically generate firing sequences (e.g., using a sigma delta converter) that does not account for the possibility of a misfire.

In one approach, a fixed firing sequence is used when a misfire is detected and the corresponding working chamber is deactivated or skipped. That is, one or more lookup tables are used that include multiple predefined firing sequences. Each of the firing sequences, which are determined to have acceptable NVH characteristics, and are associated with a particular firing fraction and/or engine speed. When a transition to a fixed firing pattern is made, the firing fraction determination module 202 selects one of the firing sequences based on the identity of the misfired working chamber, a desired firing fraction (reflecting a desired torque), gear, engine speed, manifold absolute pressure (MAP), cylinder mass air charge, cam setting, sparking timing and/or other engine settings. In other words, a suitable, predetermined firing sequence is chosen that skips the faulty working chamber, delivers the requested engine torque (assuming that the desired output does not exceed the maximum engine output with a disabled working chamber) and generates acceptable levels of NVH. The NVH may be poor, but the alternative is not to deliver the requested torque, which is generally less desirable than poor NVH. The firing control unit 204 then operates the engine in a skip fire manner using the firing sequence. Note that torque requests near full power operation will be unmet because the engine cannot meet the request without operating on all cylinders.

The above approach can be implemented in a wide variety of ways. In some embodiments, for example, an algorithm can be used to navigate a table to find a suitable target firing fraction. An example table is shown below:

| Firing fraction | Firing sequence | Skip if misfiring cylinder is | Engine speed (RPM) |
| --- | --- | --- | --- |
| ⅛ | 1000-0000 | 1 | 1600 |
| ⅛ | etc | etc | |
| ⅛ | 0000-1000 | 6 | 1600 |
| ⅙ | 1000 0010 0000 | 1, 4, 6, 7 | 1500 |
| ⅙ | 0100 0001 0000 | 8, 3, 5, 2 | 1500 |
| ¼ | 1000-1000 | 1, 6 | 1100 |
| ¼ | 0100-0100 | 8, 5 | 1100 |

| Firing fraction | Firing sequence | Skip if misfiring cylinder is | Engine speed (RPM) |
| --- | --- | --- | --- |
| ⅜ | 1001-0010 | 1, 2, 4 | 1500 |
| ⅜ | 0100-1001 | 8, 6, 3 | 1500 |
| ½ | 1010-1010 | 1, 7, 6, 4 | 900 |
| ½ | 0101-0101 | 8, 2, 5, 3 | 900 |
| ⅝ | 1011-0110 | 1, 7, 2, 5, 4 | 1500 |
| ⅝ | 0101-1011 | 8, 2, 6, 4, 3 | 1500 |
| ⅝ | 1010-1101 | 1, 7, 6, 5, 3 | 1500 |
| ¾ | 1110-1110 | 1, 8, 7, 6, 5, 4 | 900 |
| ¾ | 1101-1101 | 1, 8, 2, 6, 5, 3 | 900 |
| ¾ | 1011-1011 | 1, 7, 2, 6, 4, 3 | 900 |
| ¾ | 0111-0111 | 8, 7, 2, 5, 4, 3 | 900 |
| ⅞ | 0111-1111 | 8, 7, 2, 6, 5, 4, 3 | 900 |
| ⅞ | Etc | etc | 900 |

The above table describes a variety of suitable predetermined firing sequences and firing fractions with corresponding engine speed limits. It assumes that cylinders are fired in the order 1-8-7-2-6-5-4-3. The table also indicates that some firing fractions and sequences cannot be used, depending on which cylinder is misfiring. In this example, when it is determined that a particular cylinder is misfiring, the above table is navigated in the following manner:

1) Start in the top row
2) Move to the next row until the value in the first column ("firing fraction") is larger than the desired firing fraction, which is determined based on a desired torque;
3) In that row, look in the third column ("Skip if misfiring cylinder is"). If the misfiring cylinder is cited, repeat at step 2. Else go to step 4.
4) If the value in the fourth column ("engine speed") is larger than the current engine speed, move to the next row and repeat step 2. Optionally, a different column per gear can be used.
5) If the value in the fourth column ("engine speed") is not larger than the current engine speed, the value in the first column ("firing fraction") is the target firing fraction and the value in the second column ("firing sequence") is the target firing sequence. The target firing fraction and target firing sequence are then used to operate the working chambers of the engine in a skip fire manner.

It should be appreciated that the above algorithm and table are provided only for illustrative purposes, and may be adjusted as appropriate for different engine designs and applications. For example, idling on a reduced number of cylinders, i.e. 4 out of 8, may be used in the event of a cylinder misfire, without reference to the table.

In an alternative approach, with sigma delta based firing control, the misfiring working chamber can be flagged so that it is skipped. The feedback to the sigma delta controller indicates that the working chamber was skipped and so the sigma delta integrator of the sigma delta controller continues to accumulate. At the next or subsequent firing opportunity the sigma delta integrator will execute a fire command, reducing the value held in the integrator. For subsequent firing opportunities sigma delta control operates normally. In this manner sigma delta control can readily adapt to generating firing patterns that avoid firing any particular working chamber and still deliver the desired engine output (assuming that the desired output does not exceed the maximum engine output with a disabled working chamber). Skipping a misfiring cylinder can also be accomplished by not operating the sigma delta at the time of the misfiring and always commanding a skip. This is equivalent to treating the engine as having one less cylinder and can be implemented with minor resealing of the inputs to the sigma delta converter. Sigma delta control can also be used in transitions between fixed firing sequences to improve the NVH.

Figure 4:
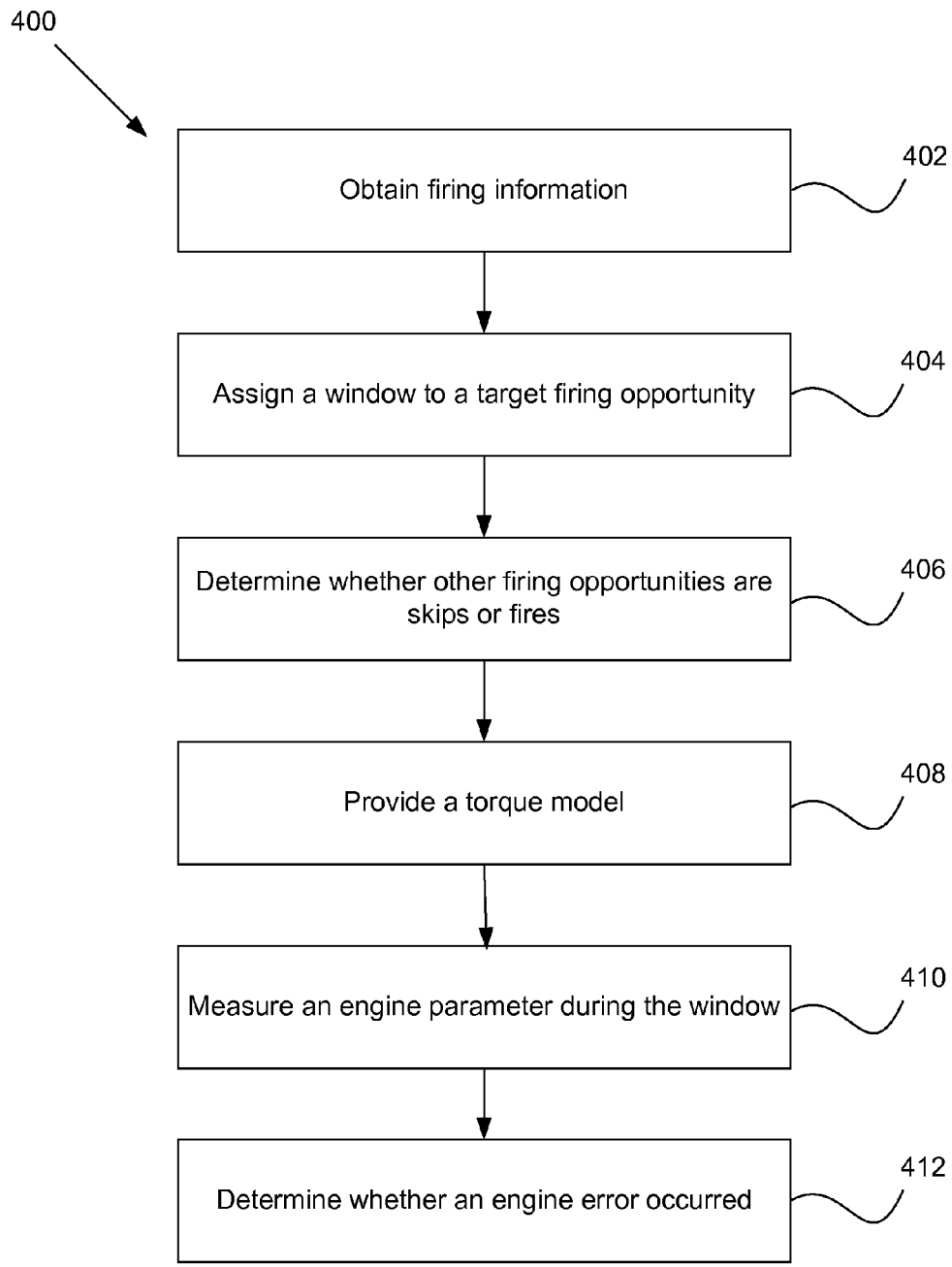
FIG. 4 is a flow diagram for a method of detecting misfire or other errors using a torque model according to a particular embodiment of the present invention.

Referring next to FIG. 4, a method 400 for detecting engine error (e.g., misfire) according to another embodiment of the present invention will be described. In the illustrated embodiment, method 400 uses a torque model to determine whether a misfire has taken place in a target working chamber, although the same techniques may be use to diagnose any suitable engine or combustion-related problem (e.g., errors in setting the spark advance.) Although the illustrated steps imply a particular order of operations, it should be appreciated that in various implementations, the steps may take place in a different order.

At step 402, firing information is obtained (step 402). At step 404, a window is assigned to a target firing opportunity associated with a target working chamber. Steps 402 and 404 may be similar or identical to steps 102 and 104 of FIG. 4.

At step 406, a determination is made as to whether the firing opportunities of other working chambers are skips or fires. Any suitable number of firing opportunities and working chambers may be examined in this step. In some embodiments, for example, the target firing opportunity is one of a set of consecutive firing opportunities that involve some or all of the available working chambers (e.g., the firing opportunities that occur in the order 1-8-7-2-6-5-4-3.) A determination is made as to whether each of the other firing opportunities in the set is a skip or a fire. In still other embodiments, other characteristics of each firing opportunity and/or the operation of its associated working chamber are also determined e.g., if a skip is scheduled, whether a high or low pressure spring is involved, the firing history of each working chamber, the operation or stroke that each working chamber is involved in during the assigned window, etc.

At step 408, the misfire detection module 208 provides or generates a torque model based on the information obtained at steps 402 and 406. The torque model helps predict or indicate expected torque generated by the working chambers during the assigned window. This torque model is based at least in part on the skip/fire determination made in step 406. The torque model may also take into account a wide variety of other operational parameters, depending on the needs of a particular application. Generally, any parameter that could affect torque generation may be involved in torque model. In various embodiments, for example, the torque model is based on cam timing, engine speed, mass air charge, cylinder load, manifold absolute pressure, spark timing and any other suitable engine parameter. In still other embodiments, the torque model is based on feedback from past measurements of changes in an engine parameter such as a crankshaft angular acceleration e.g., as indicated in step 410. Some torque model implementations take into account the status of skipped working chambers (e.g., whether the skipped working chamber involves a high pressure spring, a low pressure spring, the position of the piston, the stroke that the piston is in, etc.)

One example implementation of a torque model is described using the chart below. (It should be noted that the chart is intended to be exemplary and that various implementations may differ substantially from what is shown below.)

CHART C

| Cylinder number | Status of cylinder | Expected torque generated by cylinder (lb-ft) |
| --- | --- | --- |
| 1 | Skip (low pressure spring, first half of compression stroke) | 14 |
| 8 | Fire (second half of intake stroke) | −7 |
| 7 | Skip (high pressure spring, first half of intake stroke) | 252 |
| 2 | Fire (second half of exhaust stroke) | −7 |
| 6 | Skip (low pressure spring, first half of exhaust stroke) | −14 |
| 5 | Skip (low pressure spring, second half of power stroke) | 14 |
| 4 | Fire (first half of power stroke) | 427 |
| 3 | Skip (low pressure spring, second half of compression stroke) | −14 |

The above chart indicates hypothetical results generated by the misfire detection module 208 for a four cycle, eight cylinder engine. The chart refers to the operation of working chambers during the assigned window, where the working chambers correspond to consecutive firing opportunities (i.e., fired in the order 1, 8, 7, 2, 6, 5, 4, 3). In this example, the target firing opportunity is cylinder 4 and the assigned window is a period of time during which cylinder 4 is in the first half of a power stroke (step 404). As indicated in the "Status" column, the misfire detection module 208 determines the operation of all other working chambers during the window, and also determines whether the corresponding firing opportunity is a skip or a fire.

This example torque model takes the status of each working chamber into account to estimate an expected torque generated by each working chamber. As indicated in the chart, the expected torque for each working chamber may vary widely, depending on how the working chamber is being operated during the window. For example, consider a skipped working chamber, which can be deactivated and sealed to form a high pressure spring or a low pressure spring. A high pressure spring generally involves closing an exhaust valve to trap high pressure exhaust gases within the working chamber. In a low pressure spring, the intake valve is generally sealed after the exhaust is released from the working chamber, which forms a low pressure vacuum within the working chamber. During an intake stroke, if a low pressure spring is used, the piston is pulling against this vacuum, thus applying a different amount of torque on the crankshaft than if a high pressure spring is used. In some implementations, once the expected torques for each working chamber are determined, the individual torques are summed to determine an expected engine torque generated by all the working chambers. For example, in the above chart, the sum of the individual cylinder torque estimates is 637 lb-ft.

At step 410, a change in an engine parameter is measured during the window. In this particular example, the measured engine parameter is crankshaft angular acceleration, although any suitable engine parameter may be measured, as previously discussed in connection with step 106 of FIG. 1.

At step 412, the misfire detection module 208 then determines whether the target firing opportunity involved a misfire. This determination is made in various ways. In some approaches, for example, the misfire detection module 208 estimates an actual engine torque based on the engine parameter measured in step 410. The actual engine torque is then compared with an expected engine torque that is based on the torque model provided in step 408 (e.g., the torque output sum discussed above.) Based on this comparison, the misfire detection module 208 determines whether the target firing opportunity was a misfire. For example, if the actual engine torque is not sufficiently similar to the expected engine torque or exceeds a predetermined misfire threshold, then the misfire detection module 208 may determine that the target firing opportunity was a misfire.

In other approaches, the misfire detection module 208 estimates an expected change in the engine parameter based on the torque model. This expected change in the engine parameter is then compared to the actual change measured in step 406. Based on this comparison, the misfire detection module 208 determines whether a misfire has taken place. Any suitable engine parameter may be used in the above calculations, including but not limited to crankshaft angular acceleration or another metric related to crankshaft rotation.

In the above embodiments, the torque model is used to determine whether misfire occurred. However, it should be noted that the above steps may be used to diagnose any suitable type of combustion, valve train and/or engine errors. In some embodiments, for example, the misfire detection module 208 uses the torque model to determine whether a spark-related error took place, instead of or in addition to determining whether the target firing opportunity is a misfire (e.g., at step 412).

The described misfire detection features may be integrated into any suitable skip fire engine control system. It should be appreciated that the described misfire detection system 200 may include additional components, features or modules that are not show in FIG. 2. For example, the firing sequences generated by the firing timing determination module 202 may be based on a firing fraction. In some embodiments, the misfire detection system 200 includes a firing fraction calculator that determines this firing fraction based on a desired torque. A wide variety of firing fraction calculators, firing timing determination modules, powertrain parameter adjusting modules, ECUs, engine controller and other modules are described in co-assigned U.S. Pat. Nos. 7,954,474; 7,886,715; 7,849,835; 7,577,511; 8,099,224; 8,131,445; and 8,131,447; U.S. patent application Ser. Nos. 13/774,134; 13/963,686; 13/953,615; 13/953,615; 13/886,107; 13/963,759; 13/963,819; 13/961,701; 13/963,744; 13/843,567; 13/794,157; 13/842,234; 13/004,839, 13/654,244 and 13/004,844; and U.S. Provisional Patent Application Nos. 61/080,192; 61/104,222; and 61/640,646, each of which is incorporated herein by reference in its entirety for all purposes. Various engine diagnostic and misfire detection techniques are described in U.S. Provisional Patent Application No. 61/799,180, "Engine Diagnostics with Skip Fire Control," filed Mar. 15, 2013, which is also incorporated herein by reference in its entirety for all purposes. Any of the features, modules and operations described in the above patent documents may be added to the illustrated misfire detection system 200. In various alternative implementations, these functional blocks may be accomplished algorithmically using a microprocessor, ECU or other computation device, using analog or digital components, using programmable logic, using combinations of the foregoing and/or in any other suitable manner.

Any and all of the described components may be arranged to refresh their determinations/calculations very rapidly. In some preferred embodiments, these determinations/calculations are refreshed on a firing opportunity by firing opportunity basis although that is not a requirement. In some embodiments, for example, the described engine parameter change measurements, the surrounding skip-fire pattern determinations and the misfire determinations are performed on a firing opportunity by firing opportunity basis. An advantage of firing opportunity by firing opportunity operation of the various components is that it makes the controller very responsive to changed inputs and/or conditions. Although firing opportunity by firing opportunity operation is very effective, it should be appreciated that the various components can be refreshed more slowly while still providing good control (e.g., the determinations/calculations may be performed every revolution of the crankshaft, every one or more working cycles, etc.).

The invention has been described primarily in the context of detecting misfire in the skip fire operation of 4-stroke piston engines suitable for use in motor vehicles. However, it should be appreciated that the described misfire detection approaches are very well suited for use in a wide variety of internal combustion engines. These include engines for virtually any type of vehicle—including cars, trucks, boats, aircraft, motorcycles, scooters, etc.; and virtually any other application that involves the firing of working chambers and utilizes an internal combustion engine. The various described approaches work with engines that operate under a wide variety of different thermodynamic cycles—including virtually any type of two stroke piston engines, diesel engines, Otto cycle engines, Dual cycle engines, Miller cycle engines, Atkinson cycle engines, Wankel engines and other types of rotary engines, mixed cycle engines (such as dual Otto and diesel engines), hybrid engines, radial engines, etc. It is also believed that the described approaches will work well with newly developed internal combustion engines regardless of whether they operate utilizing currently known, or later developed thermodynamic cycles.

In some embodiments, the firing timing determination module utilizes sigma delta conversion to generate a skip fire firing sequence. Although it is believed that sigma delta converters are very well suited for use in this application, it should be appreciated that the modules may employ a wide variety of modulation schemes. For example, pulse width modulation, pulse height modulation, code division multiple access (CDMA) oriented modulation or other modulation schemes may be used to deliver the drive pulse signal. Some of the described embodiments utilize first order converters. However, in other embodiments higher order converters may be used. In still other embodiments, as described in some of the aforementioned patent documents, a firing sequence is selected from a library of predefined firing sequences.

It should be also appreciated that any of the operations described herein may be stored in a suitable computer readable medium in the form of executable computer code. The operations are carried out when a processor executes the computer code. Such operations include but are not limited to any and all operations performed by the firing timing determination module 202, the firing control unit 204, the engine parameter measurement module 206, the misfire detection module 208, the misfire detection system 200, or any other module, component or controller described in this application.

The described embodiments work well with skip fire engine operation. In some implementations, working chambers are fired under close to optimal conditions. That is, the throttle may be kept substantially open and/or held at a substantially fixed positioned and the desired torque output is met by varying the firing frequency. In some embodiments, during the firing of working chambers the throttle is positioned to maintain a manifold absolute pressure greater than 70, 80, 90 or 95 kPa.

In some embodiments, the above techniques make use of the actual firing history of the cylinders so that only fired cylinders are actually considered by the misfire detection system. That is, when a cylinder is skipped, no effort is made to detect a misfire event with respect to that specific cylinder (e.g., the method of FIG. 1 is applied such that the target firing opportunity always involves a target working chamber that was arranged to be fired during the assigned window and not skipped.) In this way, the lack of the acceleration peaks during the timeslots associated with the missed firing opportunities will not be interpreted as misfires of the associated cylinders.

Although only a few embodiments of the invention have been described in detail, it should be appreciated that the invention may be implemented in many other forms without departing from the spirit or scope of the invention. FIG. 1, for example, illustrates a number of steps in a method for detecting misfire. It should be appreciated that these operations need not take place in the illustrated order, and one or more steps may be modified, reordered, removed or replaced. For example, step 108 can occur before or after step 106, since skip/fire determinations/commands are known before they are executed. Additionally, the application sometimes refers to a "skip/fire determination." This may be used interchangeably with the term, "surrounding skip/fire pattern." Both terms relate to a determination of the operation of one or more working chambers during their corresponding firing opportunities. An example of a skip/fire determination involves determining whether at least one firing opportunity preceding a target firing opportunity is a skip or a fire and determining whether at least one firing opportunity following the target firing opportunity involves a skip or a fire. The skip/fire determination can take into account different or additional firing opportunities (e.g., in various embodiments, a skip/fire determination involves determining whether a firing opportunity associated with the opposing working chamber is a skip or a fire.) Another example of a skip/fire determination involves classifying a particular firing event based on one of the aforementioned group numbers (e.g., as seen in Chart A), which each relate to a skip/fire pattern surrounding the firing event (e.g., skip before, skip afterward; fire before, skip afterward; etc.) The application discusses various ways in which the skip/fire pattern surrounding a particular target firing opportunity might affect engine parameter measurements for that firing opportunity. It should be noted that these described effects characterize particular example implementations, and are not required. That is, the effects of various skip/fire determinations may differ for different engine designs, engine settings and applications. Therefore, the present embodiments should be considered illustrative and not restrictive and the invention is not to be limited to the details given herein.

What is claimed is:

1. A method for detecting misfire in a skip fire engine control system, the method comprising:
    assigning a window to a target firing opportunity for a target working chamber;
    attempting to fire the target working chamber during the target firing opportunity;
    measuring a change in an engine parameter during the window;
    determining whether a firing opportunity before the target firing opportunity is a skip or a fire and whether a firing opportunity after the target firing opportunity is a skip or a fire; and
    determining whether the target working chamber misfired based at least in part on the skip or fire determination from before and after the target firing opportunity and the measured change in the engine parameter.

2. A method as recited in claim 1 further comprising:
    determining whether a firing opportunity for a working chamber that opposes the target working chamber is a skip or a fire wherein the misfire determination is further based at least in part on the skip or fire determination for the opposing working chamber.

3. A method as recited in claim 1 wherein the determination as to whether the target working chamber misfired is further based on a vibration impact model, the vibration impact model involving at least one selected from the group consisting of firing fraction, cylinder load and engine speed.

4. A method as recited in claim 1 wherein:
    the window is based on a predetermined amount of angular rotation of a crankshaft; and
    the measured change in the engine parameter is based on crankshaft angular acceleration.

5. A method as recited in claim 1 wherein the misfire determination involves determining whether the engine parameter change exceeds a predetermined misfire threshold.

6. A method as recited in claim 5 wherein the misfire threshold is different depending on 1) whether a firing opportunity that immediately precedes the target firing opportunity is a skip or a fire and 2) whether a firing opportunity that immediately follows the target firing opportunity is a skip or a fire.

7. A method as recited in claim 5 wherein the misfire threshold is different depending on whether each firing opportunity in an engine cycle is a skip or a fire.

8. A method as recited in claim 5 wherein the misfire threshold is adjusted based on a vibration impact model, the vibration impact model involving at least one selected from the group consisting of firing fraction, cylinder load and engine speed.

9. A method as recited in claim 1 wherein the measuring of the change in the engine parameter involves detecting changes in content of exhaust gas from the target working chamber.

10. A method as recited in claim 1 further comprising:
    determining that the target working chamber is misfiring;
    flagging the misfiring working chamber so that it can be skipped; and
    feeding back a signal to a sigma delta controller indicating that the misfiring working chamber was skipped, the sigma delta controller including a sigma delta integrator wherein the feedback signal to the sigma delta controller indicates that the target working chamber was skipped, which causes the sigma delta integrator to continue to accumulate.

11. A method as recited in claim 1 further comprising:
    attempting to fire the target working chamber multiple times;
    repeating the skip or fire determination for the target working chamber for each of the firing attempts;
    determining, for each of the firing attempts, whether a predetermined misfire threshold was exceeded wherein the predetermined misfire threshold for each firing attempt depends on the respective skip or fire determination; and
    determining whether the target working chamber misfired using the different misfire thresholds, which are based on the different skip or fire determinations.

12. A misfire detection system for determining whether a particular working chamber has misfired, the misfire detection system being used in an engine operated in a skip fire manner, the misfire detection system comprising:
    an engine parameter measurement module that is arranged to:
    assign a window to a target firing opportunity for a target working chamber; and
    measure change in an engine parameter during the window; and a misfire detection module that is arranged to:
determine whether a firing opportunity before the target firing opportunity involves a skip or a fire and whether a firing opportunity after the target firing opportunity involves a skip or a fire; and
determine whether the target working chamber misfired based at least in part on the skip or fire determination from before and after the target firing opportunity and the measured change in the engine parameter.

13. A misfire detection system as recited in claim 12 wherein:
the misfire detection module is further arranged to determine whether a firing opportunity for a working chamber that opposes the target working chamber is a skip or a fire wherein the misfire determination is further based at least in part on the skip or fire determination for the opposing working chamber.

14. A misfire detection system as recited in claim 12 wherein:
the window is based on a predetermined amount of angular rotation of a crankshaft;
the measured change in the engine parameter is the crankshaft angular acceleration.

15. A misfire detection system as recited in claim 12 wherein the misfire determination involves determining whether the engine parameter change exceeds a predetermined misfire threshold.

16. A misfire detection system as recited in claim 15 wherein the misfire threshold is different depending on 1) whether a firing opportunity that immediately precedes the target firing opportunity is a skip or a fire and 2) whether a firing opportunity that immediately follows the target firing opportunity is a skip or a fire.

17. A misfire detection system as recited in claim 12 wherein the measuring of the change in the engine parameter involves detecting changes in content of exhaust gas from the target working chamber.

18. A misfire detection system as recited in claim 12 further comprising:
a firing control unit arranged to operating an engine in a skip fire manner, the engine including a plurality of working chambers, which includes the target working chamber wherein, if the misfire detection module determines that the target working chamber is misfiring, the firing control unit is arranged to deactivate the misfiring working chamber while operating the other working chambers in a skip fire manner.

19. A method for detecting misfire in a skip fire engine control system, the method comprising:
assigning a window to a target firing opportunity for a target working chamber;
attempting to fire the target working chamber during the target firing opportunity;
measuring a change in an engine parameter during the window;
determining whether a firing opportunity before the target firing opportunity is a skip or a fire and whether a firing opportunity after the target firing opportunity is a skip or a fire; and
determining whether the target working chamber misfired based at least in part on the skip or fire determination,
wherein the misfire determination involves determining whether the engine parameter change exceeds a predetermined misfire threshold, and
wherein the misfire determination further comprises selecting a misfire threshold from a set of at least four different predetermined misfire thresholds, each of the four predetermined misfire thresholds corresponding to a different combination of skips and fires for the firing opportunities before and after the target firing opportunity.

20. A method for detecting misfire in a skip fire engine control system, the method comprising:
assigning a window to a target firing opportunity for a target working chamber;
attempting to fire the target working chamber during the target firing opportunity;
measuring a change in an engine parameter during the window;
determining whether a firing opportunity before the target firing opportunity is a skip or a fire and whether a firing opportunity after the target firing opportunity is a skip or a fire;
determining whether the target working chamber is misfiring based at least in part on the skip or fire determination; and
determining a firing sequence that takes into account the misfiring working chamber wherein the determination of the skip fire firing sequence involves selecting one of a plurality of predetermined firing sequences and wherein the selection is based on an identity of the misfiring working chamber and at least one selected from the group consisting of gear, engine speed and firing fraction.

21. A misfire detection system for determining whether a particular working chamber has misfired, the misfire detection system being used in an engine operated in a skip fire manner, the misfire detection system comprising:
an engine parameter measurement module that is arranged to:
assign a window to a target firing opportunity for a target working chamber; and
measure change in an engine parameter during the window; and
a misfire detection module that is arranged to:
determine whether a firing opportunity before the target firing opportunity involves a skip or a fire and whether a firing opportunity after the target firing opportunity involves a skip or a fire; and
determine whether the target working chamber misfired based at least in part on the skip or fire determination.
wherein the misfire determination involves determining whether the engine parameter change exceeds a predetermined misfire threshold, and
wherein the misfire determination further comprises selecting a misfire threshold from a set of at least four different predetermined misfire thresholds, each of the at least four predetermined misfire thresholds corresponding to a different combination of skips and fires for the firing opportunities before and after the target firing opportunity.

22. A misfire detection system for determining whether a particular working chamber has misfired, the misfire detection system being used in an engine operated in a skip fire manner, the misfire detection system comprising:
an engine parameter measurement module that is arranged to:
assign a window to a target firing opportunity for a target working chamber; and
measure change in an engine parameter during the window; and a misfire detection module that is arranged to:
determine whether a firing opportunity before the target firing opportunity involves a skip or a fire and whether a firing opportunity after the target firing opportunity involves a skip or a fire;
determine whether the target working chamber misfired based at least in part on the skip or fire determination;
a firing control unit arranged to operating an engine in a skip fire manner, the engine including a plurality of working chambers, which includes the target working chamber wherein, if the misfire detection module determines that the target working chamber is misfiring, the firing control unit is arranged to deactivate the misfiring working chamber while operating the other working chambers in a skip fire manner;
a firing timing determination module that is arranged to generate a firing sequence that is used by the firing control unit to operate the working chambers of the engine in a skip fire manner wherein:
the firing timing determination module is arranged to select one of a plurality of predetermined firing sequences when the misfire detection module determines that the target working chamber is misfiring; and
the selection of the predetermined firing sequence is based at least in part on an identity of the misfiring working chamber and at least one selected from the group consisting of gear, engine speed and firing fraction.

23. A method for determining engine error in a skip fire engine control system, the skip fire engine control system including an engine having a plurality of working chambers, the method comprising:

assigning a window to a target firing opportunity;
determining whether each of a plurality of firing opportunities including opportunities before and after the target firing opportunity are skips or fires wherein each firing opportunity is associated with a different one of the working chambers;
providing a torque model that helps indicate expected engine torque generated by the working chambers during the window wherein the torque model is based at least in part on the skip or fire determinations;
measuring an engine parameter during the window; and
determining whether an engine error has occurred based on the measured engine parameter and the torque model which is based at least in part on the skip or fire determinations before and after the target firing opportunity.

24. A method as recited in claim 23 herein the torque model is further based on at least one selected from the group consisting of: spark advance, cam timing, engine speed, mass air charge, cylinder load, absolute manifold pressure, piston stroke, a crankshaft angular acceleration measurement and distinguishing between usage of a high or low pressure spring in one of the working chambers.

25. A method as recited in claim 23 wherein:
the measured engine parameter is crankshaft angular acceleration; and
the determination of the engine error involves determining whether the target firing opportunity is a misfire.

* * * * *